(12) United States Patent
Bertora et al.

(10) Patent No.: US 11,139,098 B2
(45) Date of Patent: Oct. 5, 2021

(54) BI-STABLE ACTUATOR BASED ON ELECTROMAGNETIC ATTRACTION

(71) Applicant: FONDAZIONE ISTITUTO ITALIANO DI TECNOLOGIA, Genoa (IT)

(72) Inventors: Franco Bertora, Genoa (IT); Luca Brayda, Campomorone (IT); Giulio Sandini, Genoa (IT)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 353 days.

(21) Appl. No.: 16/325,926

(22) PCT Filed: Aug. 25, 2017

(86) PCT No.: PCT/IB2017/055124
§ 371 (c)(1),
(2) Date: Feb. 15, 2019

(87) PCT Pub. No.: WO2018/042300
PCT Pub. Date: Mar. 8, 2018

(65) Prior Publication Data
US 2019/0214174 A1     Jul. 11, 2019

(30) Foreign Application Priority Data

Aug. 30, 2016 (IT) ...................... 102016000088204

(51) Int. Cl.
*H01F 7/16* (2006.01)
*H01F 27/28* (2006.01)
(Continued)

(52) U.S. Cl.
CPC ........... *H01F 7/1646* (2013.01); *G06F 3/016* (2013.01); *G09B 21/004* (2013.01); *H01F 7/122* (2013.01);
(Continued)

(58) Field of Classification Search
CPC ....... G06F 3/016; G06F 3/041; G09B 21/004; H01F 2027/2809; H01F 27/2804; H01F 7/122; H01F 7/1646
See application file for complete search history.

(56) References Cited

U.S. PATENT DOCUMENTS 7,031,592 B2 * 4/2006 Akieda ................. G06F 3/0354
345/156
9,791,931 B2 * 10/2017 Tachiiri ............... H01F 27/2823
(Continued)

FOREIGN PATENT DOCUMENTS

KR      20120031779 A    4/2015
WO      2015077846 A1    6/2015

OTHER PUBLICATIONS

Zarate, et al., Optimization of the force and power consumption of a microfabricated magnetic actuator, Sensors and Actuators A 234 (2015) 57-64.
(Continued)

*Primary Examiner* — Bernard Rojas
(74) *Attorney, Agent, or Firm* — Thomas|Horstemeyer LLP (57) ABSTRACT

An electromagnetic actuator comprising a moving armature (41) comprising a pin (43) and a permanent magnet arrangement (45) arranged coaxially with the pin (43) and secured to it, and an excitation coil arrangement (42) arranged coaxially with the pin (43). The coil arrangement (42) is suppliable with a current to cause a movement of the movable armature (41). The actuator further comprises a surface (51) of ferromagnetic material. The permanent magnet arrangement (45) is axially interposed between the surface (51) of ferromagnetic material and the excitation coil arrangement (42). The permanent magnet arrangement (45) comprises a plurality of permanent magnet regions (45a) arranged around the pin (43) of the moving armature (41),
(Continued)

wherein each permanent magnet region (45a) has a polarity opposite to the polarities of the permanent magnet regions (45a) angularly adjacent thereto. The excitation coil arrangement (42) comprises a coil having a lobed shape.

10 Claims, 5 Drawing Sheets

(51) Int. Cl.
  *G06F 3/01* (2006.01)
  *G09B 21/00* (2006.01)
  *H01F 7/122* (2006.01)
  *G06F 3/041* (2006.01)
(52) U.S. Cl.
  CPC ......... *H01F 27/2804* (2013.01); *G06F 3/041* (2013.01); *H01F 2027/2809* (2013.01)

(56) References Cited

U.S. PATENT DOCUMENTS

| | | | |
|---|---|---|---|
| 10,013,080 B2* | 7/2018 | Tachiiri | G06F 3/0338 |
| 10,042,437 B2* | 8/2018 | Hisatsugu | G06F 3/03548 |
| 2004/0056745 A1 | 3/2004 | Watanabe | |

OTHER PUBLICATIONS

Mederoud, et al., Bistable Micro Actuator for Energy Saving.
Simeonov, et al. Graphical Interface for Visually Impaired People Based on Bi-stable Solenoids, International Journal of Soft Computing and Software Engineering, 3, pp. 1-4.
International Search Report and Written Opinion issued in PCT/IB2017/055124 dated Nov. 9, 2017.

\* cited by examiner

BI-STABLE ACTUATOR BASED ON ELECTROMAGNETIC ATTRACTION

CROSS-REFERENCE TO RELATED APPLICATIONS

This application is the 35 U.S.C. § 371 national stage application of PCT Application No. PCT/IB2017/055124, filed Aug. 25, 2017, where the PCT claims the priority to and benefit of Italian Patent Application No. 1020160000788204, filed Aug. 30, 2016, both of which are herein incorporated by reference in their entireties.

The present invention generally refers to electromagnetic actuators, and in particular to actuators used in tactile displays.

Tactile feedback enhances the experience of using mobile audio and video devices by approximating tactile stimulation with a variety of techniques. However, there is still no tactile feedback that truly approximates the one normally provided by a physical key. At present, the devices available on the market are able to produce non-localized, vibrational feedback providing little information, the perception of which may be greatly reduced by masking or tolerance phenomena.

To solve this problem, current technologies are attempting to pursue two goals: 1) to provide truly localized feedback, and at the same time 2) to keep the actuation systems for the mobile market economical and small. Such requirements are conflicting, given that generally high actuation forces correspond to heavy, bulky and expensive solutions.

Many research centers and companies are studying large area tactile display solutions to make the digital world more accessible to the blind and visually impaired community. However, there are still no portable devices that have both a tactile area large enough to show a sufficient amount of graphic information and a weight and bulk such as to render the system portable.

One of the most common concepts in tactile technology consists of moving needles electromagnetically or piezoelectrically and perpendicularly with respect to a surface, which may be easily perceived with the fingertips via the sense of touch.

The products currently available and using electromagnetic or piezoelectric technologies are overly expensive, and thereby only 5% of the blind population have access to one-dimensional Braille display devices (also known as "Braille bars"), and an even lower percentage are able to afford a tactile graphical display. In the last few years, tactile display matrices able to show two-dimensional graphical information have become available: this means an arrangement of multiple actuators on a surface, each capable of reaching at least two configurations, called 'on' and 'off', so that a bas-relief graphic representation is formed, where the 'off' state corresponds to 'lowered' and the 'on' state corresponds to 'raised'.

Systems available on the market use technologies that have a high per-item cost due to the large number of individually assembled components, and the cost increases linearly with the number of needles/pins. Recent approaches attempt to use the advances of MEMS technologies, with the great advantage of avoiding a point-to-point assembly of actuators, as a large area fully provided with actuators may be produced using batch processing technologies. Consequently, the cost is mainly determined by the number of processing steps required, irrespective of the number of pins/actuators made on the given surface. Such technologies allow the production of larger areas in one piece.

Moreover, solutions centered on miniaturized "taxels" (defined as the tactile equivalent of pixel) rarely include— even at the research level—latching, i.e., the technology of maintaining tactile information without consuming energy for applying the force and displacements required for tactile actuators, a crucial aspect for portability and energy consumption. Moreover, any technique must take into account the pressure exerted by the fingers; recent perceptive studies have shown that a minimum pressure of 60 mN/cm$^2$ (about 6 grams) of the taxel on a finger is required to ensure a perceptible stimulus.

In addition, the mechanical displacement of the taxels from their rest position must be at least 200 µm, a threshold above which the recognition of tactile patterns is effective and does not increase significantly.

Finally, touching and understanding the bas-relief may take a few seconds to allow proper cognitive mapping, and therefore refresh rates over 1 Hz are not necessary.

The document "Graphical Interface for Visually Impaired People Based on Bi-Stable Solenoids" (S. Simeonov et al., International Journal of Soft Computing and Software Engineering Vol. 3: 128, 01/2014) describes a tactile screen for blind people. The device consists of bistable tactile actuators, solenoids and a PIC-based control card.

The document "Bistable Micro Actuator for Energy Saving" (P. Meneroud et al, Actuator 2006, Jun. 16, 2006) describes a linear flip-flop magnetic microprocessor composed of permanent magnets that ensure bistability and suppress leakage in operational states. The technology proposed in such document requires the presence of two coils that are embedded in pot-shaped magnets.

The document "Optimization of the force and power consumption of a microfabricated magnetic actuator" (J. J. Zárate et al., Sensors and Actuators A 234 (2015) 57-64, Aug. 21, 2015) describes a device based on a disc-shaped permanent magnet centered on a planar micro-coil. Such electromagnetic technology allows scalability up to matrices of thousands of actuators for aptic applications ('aptic' meaning any system that can simultaneously leverage the tactile perception and the proprioceptive system of the person through movement). The solution proposed in such document is, however, not bistable.

An object of the invention is to provide an electromagnetic actuator solution that does not require energy consumption to keep the taxels in the raised or 'on' position.

Another object of the invention is to provide an electromagnetic actuator solution having a higher degree of miniaturization with respect to the known solutions.

For this purpose, the object of the invention is an electromagnetic actuator comprising a moving armature comprising a pin movable in a guided manner along a longitudinal axis thereof, and a permanent magnet arrangement arranged coaxially with the pin and fixed thereto, and an excitation coil arrangement arranged coaxially with the pin, said coil arrangement being suppliable with a current to cause the moving armature to move, characterized further by the fact of comprising a surface of ferromagnetic material, said permanent magnet arrangement being axially interposed between the surface made of ferromagnetic material and the excitation coil arrangement, wherein said permanent magnet arrangement comprises a plurality of permanent magnet regions arranged around the pin of the moving armature, wherein each permanent magnet region has a polarity in the direction of the longitudinal axis of the pin which is opposite to the polarities of the permanent magnet regions angularly adjacent thereto, and wherein said excitation coil arrangement comprises at least one coil having a lobed shape, and comprising a number of coil lobes equal to half the number of permanent magnet regions of the magnet arrangement.

The proposed system is miniaturized with respect to most known systems. By using commercial components, it is possible to reach a taxel pitch on the order of 1 mm. This is achievable due to the lobed shape of the coil.

Moreover, according to the present description, the coils are planar and do not require more than one winding to manufacture the excitation coils on a single-layer PCB. Even if the coils comprise multiple windings, it is possible to contain their axial dimensions and thus manufacture them on a multi-layer PCB.

Moreover, the problem of latching is solved whereby energy needs only to be consumed during on-off transitions. This is achievable with the force equilibrium that occurs when the moving armature adheres to the magnetic surface.

Moreover, in the case of multiple adjacent actuators, there is no interference between the actuators. This is achievable by the fact that the permanent magnet arrangement of each moving armature causes the magnetic flux to close within the space of the single actuator, with minimal interference between adjacent actuators.

In addition, the device may be configured to operate with actuation pulses on the order of a few milliseconds and with reduced power consumption.

Furthermore, according to the present description, the single actuator/taxel is sized to have taxel stability with respect to unwanted cancellations caused by excessive pressure of the finger during reading. While reading, if one's finger pushes a taxel down, the space traveled from the taxel downwards is not enough to create a second force equilibrium, such as to drive the taxel to the 'off' position. Instead, the taxel acts as a spring and returns to the 'on' position.

Moreover, according to the present description, if, when updating the image, the user leaves his/her finger on one or more taxels that must reach the 'on' state, the force equilibrium is such that they will lift as soon as the pressure is released, even if the excitation pulse is over. In other words, the user does not need to keep his/her hands off of the screen during the upgrade phase. This is achievable by the fact that the unstable force equilibrium is reached when the taxel is not yet in contact with the finger trying to prevent the taxel from emerging. At contact with a finger, the taxel exerts a pressure from below, without consuming energy, and then reaches its 'on' position as soon as the finger is removed.

The permanent magnet arrangement and the ferromagnetic surface are arranged so as to reduce the chance of spontaneous attraction, therefore—unless the device is turned over—the taxels remain in the off position if the excitation coil arrangement is not powered. In one embodiment, it is possible to provide for elastic means to have a second position of force equilibrium near the excitation coil arrangement even when the device is turned over.

Further features and advantages of the invention will become apparent from the detailed description that follows, made with reference to the appended drawings, provided by way of non-limiting example, wherein.

Figure 1:
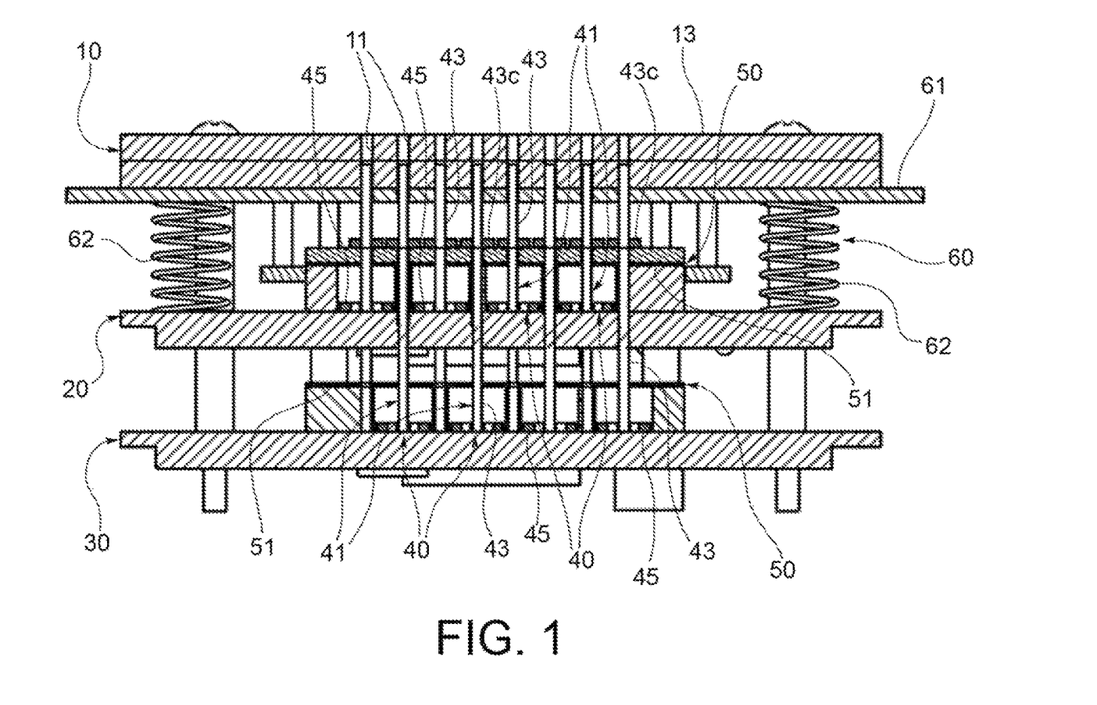
FIG. 1 is a sectional view of a tactile display according to the present invention.
Figure 2:
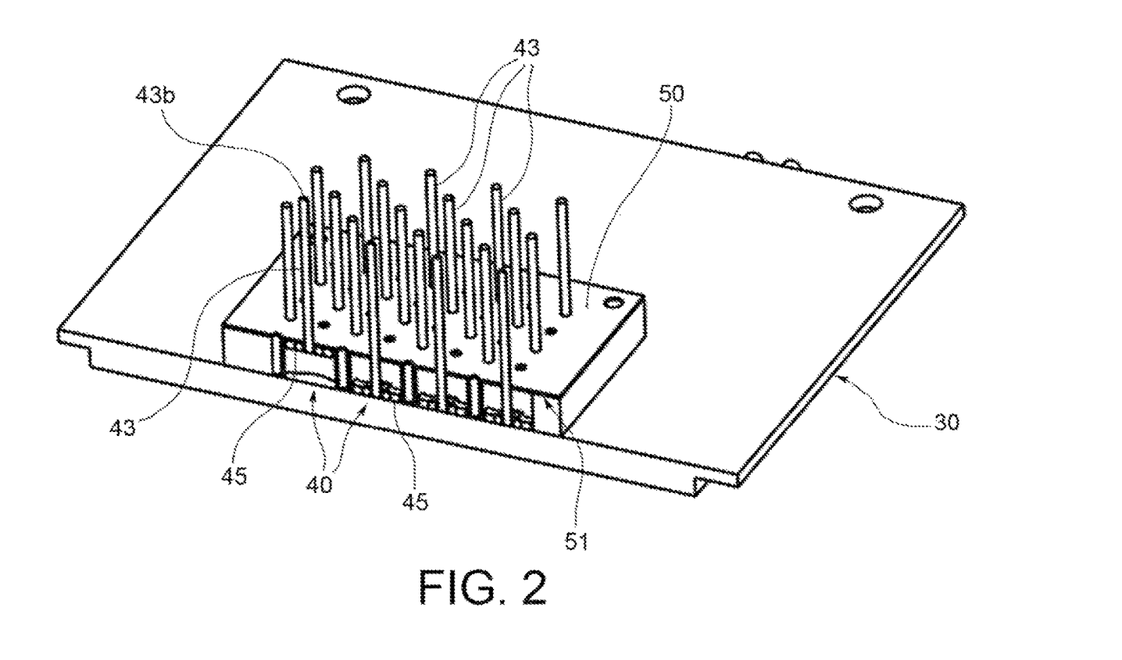
FIG. 2 is a perspective view of part of the display of FIG. 1.
Figure 3:
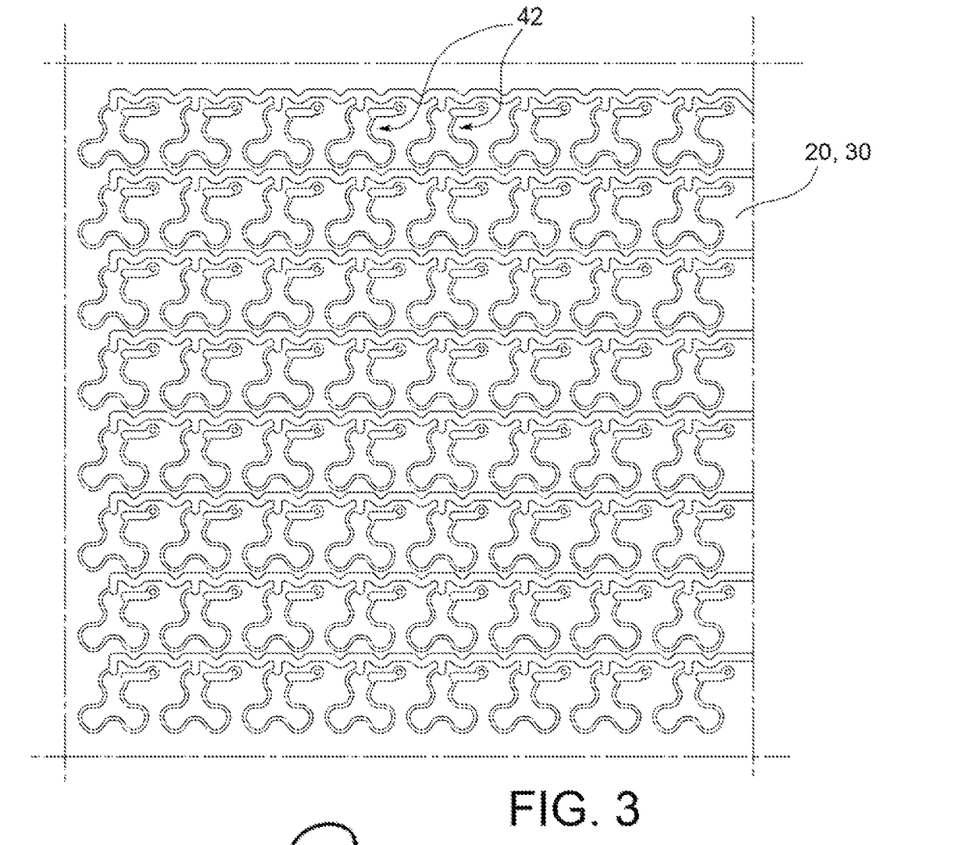
FIG. 3 is a plan view of a plurality of excitation coils of the display of FIG. 1.

With reference to FIGS. 1 to 3, a tactile display comprises a support structure formed by a display plate 10 and a plurality of support plates 20, 30 arranged parallel to the support plate and connected to each other by means of vertical members.

Figure 6A:
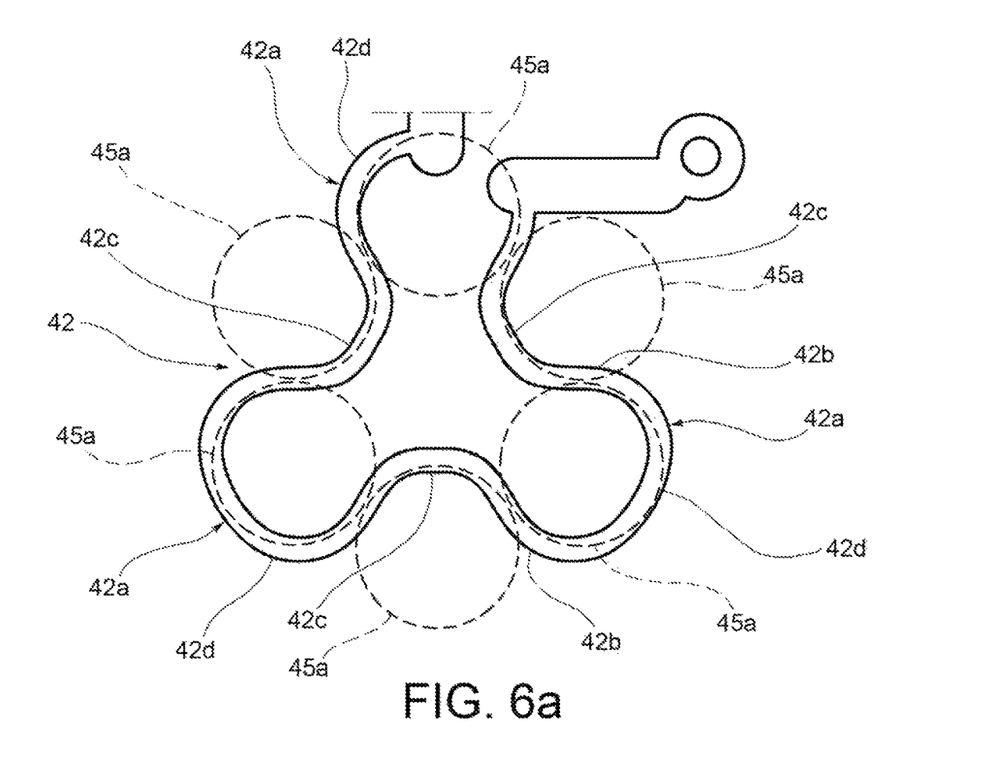
FIG. 6a is a plan view of an excitation coil arrangement associated with an actuator of the display of FIG. 1.

An array of actuators 40 are arranged on each support plate 20, 30. The actuators 40 supported by a support plate 20 are arranged laterally offset with respect to the actuators 40 supported by the other support plates 30. Each actuator 40 comprises a moving armature 41 and an excitation coil arrangement 42. The moving armature 41 of each actuator 40 comprises a pin 43, made of a magnetically inert material and movable in a guided mode along a longitudinal axis thereof, and a permanent magnet arrangement 45, arranged coaxially with the pin and fixed thereto. Each coil arrangement 45 includes a planar coil arranged coaxially with the pin 43 of the respective actuator 40. In FIG. 6, a "+" sign represents the position of the central axis of the coil arrangement 45 coinciding with the longitudinal axis of the pin 43 of the respective actuator 40. The coil arrangements 45 are formed on an upper surface of each support plate 20, 30, in the positions of the respective actuators 40, as shown in FIG. 3.

Through the support plates, excluding the support plate positioned below, guide holes are made through which the pins 43 of the actuators 40 pass. Through the display plate 10 a plurality of sliding guides 11 are made, inside each of which the pin 43 of the moving armature of a respective actuator 40 is partially arranged. The display plate 10 has a reference surface 13 from which the sliding guides 11 debouch.

The tactile display further comprises a sheet of ferromagnetic material 50 associated with each support plate 20, 30 and arranged at a predetermined distance from it by means of a support structure connecting the sheet 50 to the respective support plate 20, 30.

Each sheet 50 thus has a surface 51 facing the actuators 40 of the support plate 20, 30 to which it is associated and provided with holes to allow the pins 43 to pass so that they may reach the guide holes 11 of the display plate 10.

Figure 4:
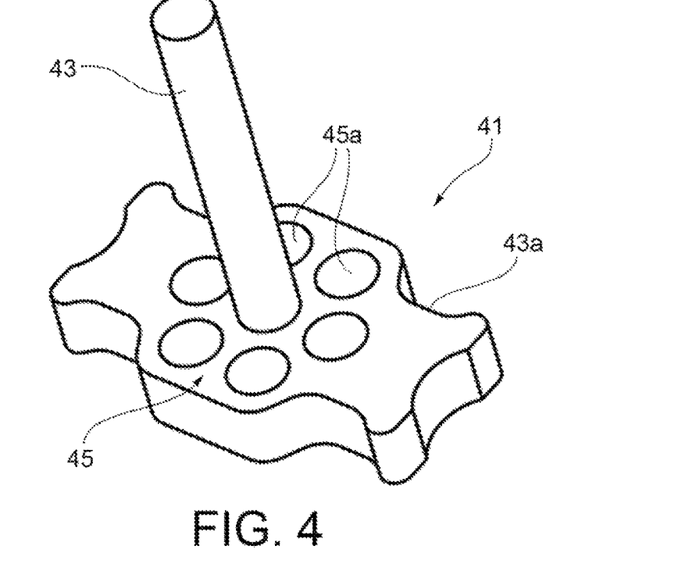
FIG. 4 is a perspective view of a moving armature of an actuator of the display of FIG. 1.
Figure 5:
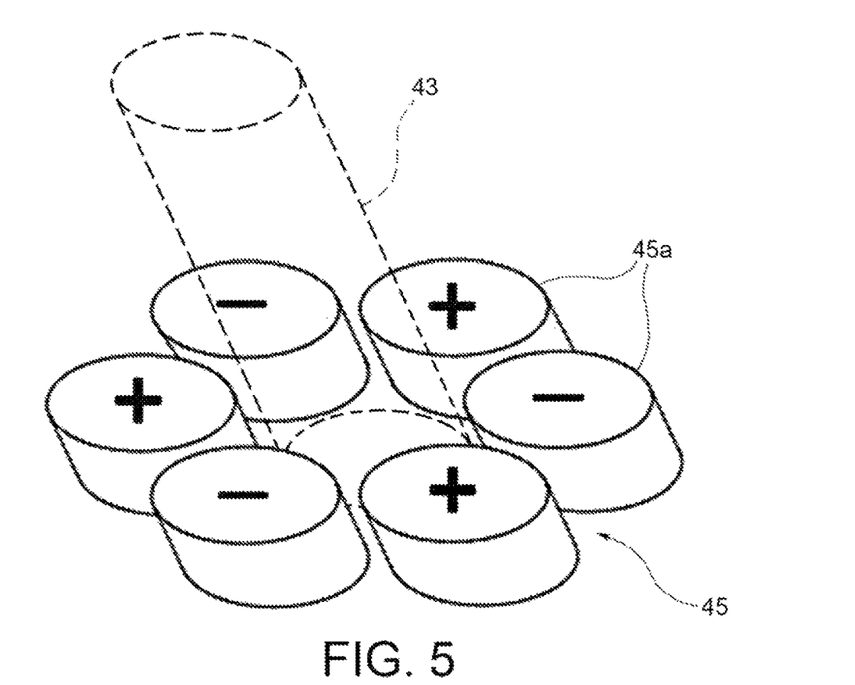
FIG. 5 is a view of a permanent magnet arrangement of the moving armature of FIG. 4.

With reference to FIGS. 4 and 5, a possible embodiment of the moving armature 41 of the single actuator 40 is illustrated.

FIG. 4 shows the pin 43 and a magnet support structure 43a fixed to the pin 43, or made integral with it. Similarly to the pin 43, the magnet support structure 43a is made of magnetically inert material (e.g. plastic). The magnet support structure is fixed to the permanent magnet arrangement, which in the illustrated example consists of a plurality of separate permanent magnets 45a arranged coaxially around the pin 43.

FIG. 5 shows that the magnets of the permanent magnet arrangement 45 are configured such that the north and south poles are arranged in the longitudinal direction of the pin 43 and that the north and south poles of each magnet are respectively adjacent to the south and north poles of the magnets angularly adjacent thereto. In other words, if the assembly is seen from above (or from the tip of the pin 43), a number N of magnets is arranged so that N/2 of the magnets show the observer the north pole while N/2 of the magnets show the south pole.

The lines of force that come from the north (or south) pole of each magnet divide and close on the south (or north) pole of the two adjacent magnets. This fact has two advantageous effects both on the side next to the coil and on that facing the sheet 50. On the side next to the coil, the lines of force have a course that largely follows the ideal circumference along which the magnets are arranged and thus have the maximum intensity at the inflection points of the coils 42. A substantially smaller portion of the flux lines rejoins the opposite pole of the source magnet and, again, has a course perpendicular to the concave and convex portions of the coils 42. The combination of the particular shape of the coil and the arrangement of the magnets therefore maximizes the force exchanged between the two entities.

On the side facing the sheet 50, the course of the lines of force is similar and equally advantageous, as it is concentrated in the region immediately adjacent to the magnets. This arrangement involves a high magnetic field gradient which produces a strong attraction when the surface of the magnet arrangement 45 is located near the sheet 50 and is negligible when it is adjacent to the coils 42.

In the rest position (flat or not raised), also referred to as the 'off' position, the magnet arrangement 45 lies near the excitation coil arrangement 42, and the surface 51, made of ferromagnetic material, is far from it in the direction of the force of actuation at a distance such that the force of attraction between the surface 51, made of ferromagnetic material, and the magnet arrangement 45 is weak enough to have no effect on the magnet arrangement 45. In the 'off' position, the force equilibrium is such that no movement is caused by the components of the permanent magnet arrangement 45. For example, in FIG. 2, which represents only the lower support plate 30 of the tactile display, without the upper levels, three actuators/taxels 40 are shown in the 'off' position, while the left-most actuator/taxel 40 is shown in the 'on' position.

A short current pulse in the excitation coil arrangement 42 generates sufficient force to move the moving armature 41 in the direction of the ferromagnetic surface 51, causing it to reach the region wherein the attraction exerted by the surface 51 prevails and the permanent magnet arrangement 45 adheres to the magnetic surface 51 (directly to or through an intermediate magnetically inert member) in the raised position, hereinafter also referred to as the 'on' position. From this point on, the power supply may be interrupted and the device remains in the 'on' position.

In such state, the raised pins 43 may be touched by a user, who may exercise an arbitrary force on the pin 43 without the same being able to return to the 'off' position; the permanent magnet arrangement 45 is configured with respect to the rest of the actuator 40 and the ferromagnetic plate 50 so as to create a second force equilibrium. In the 'on' position, the force equilibrium is such that magnetic adhesion to the ferromagnetic material prevails over any other effect. The free end 43b of the pin 43 protrudes with respect to the reference surface 13 by a length such that the pressure exerted (e.g., by a finger) on the free end 43a of the pin 43 and tending to bring the free end 43a of the pin 43 level with the reference surface 13, is not able to bring the moving armature 41 to the 'off' position. The pin 43 at the release of the pressure on it then returns to its 'on' position without any energy being consumed.

To bring the pins 43 back to the 'off' position, mechanical restoring means 60 may be provided, axially interposed between the surface 51 made of magnetic material and the permanent magnet arrangement 45. In the example illustrated, these means are formed by a restoring plate 61 made of magnetically inert material and movable in the axial direction. The plate 61 is perforated for the pins 43 to pass through and is intended to engage a flange portion 43c on the pins 43 of the moving armature 41. To move such plate 61 away from the display plate 10, an electrically controlled actuator (illustrated) may be provided, while springs 62 may be provided to push the restoring plate 61 towards the display plate 10.

Figure 7:
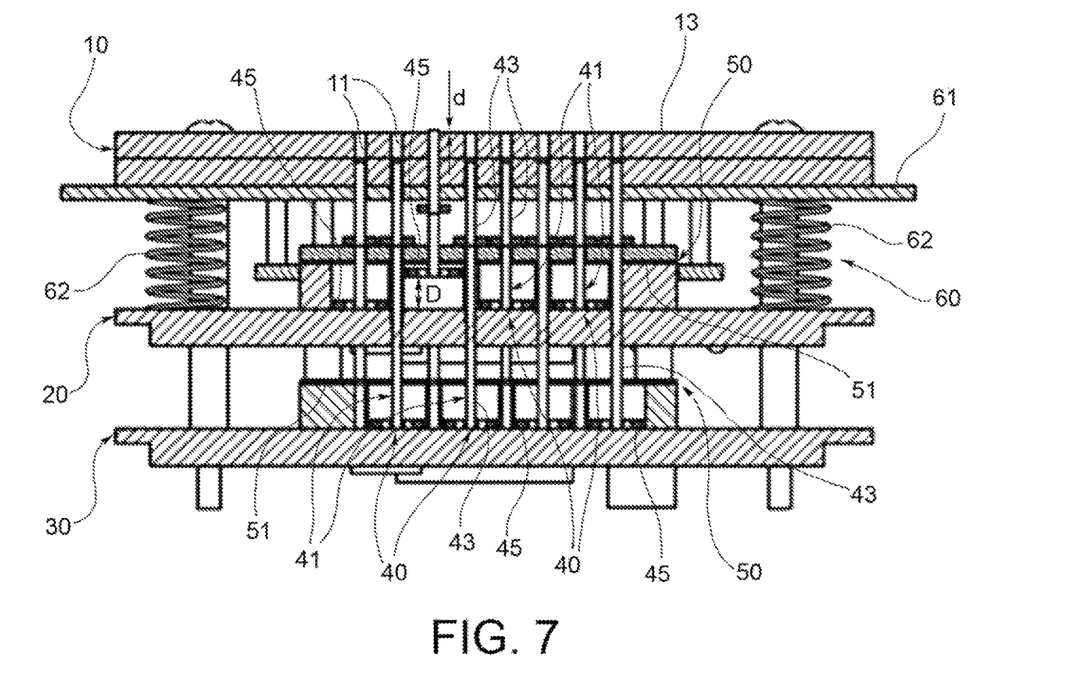
FIGS. 7 and 8 represent the device of FIG. 1 in two different operational phases.
Figure 8:
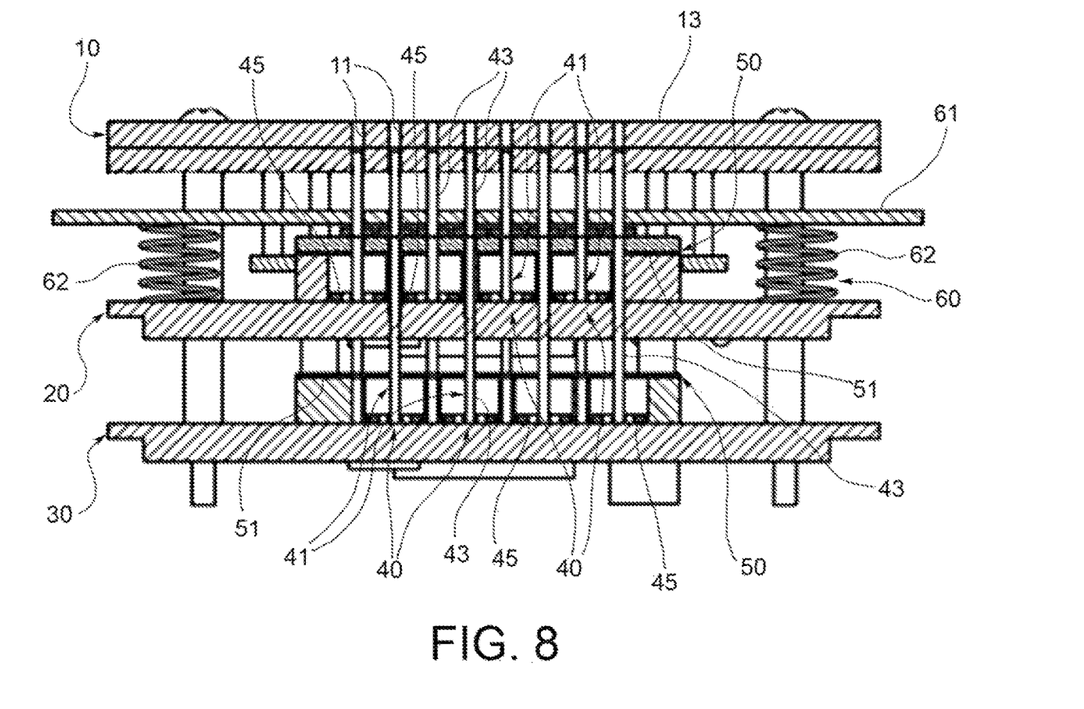

FIGS. 1, 7, and 8 show the 'off' state, followed by the 'on' state and an action reinstating the 'off' state. In particular, FIG. 7 illustrates a section of the entire device, wherein all the actuators are shown in the 'off' position (as in FIG. 1), except for a single actuator 40, which is represented in the raised position, wherein the respective pin 43 emerges slightly from the reference surface 13. In particular, the distance d with which the free end of the pin 43 emerges with respect to the reference surface 13 is lower than that of D, which would be necessary to return it to the 'off' position, as can be seen in FIG. 7. FIG. 8 shows the restoring plate 61 which, by means of a mechanical pushing action, brings all the actuators 40 of the upper support plate 20 and the lower plate 30 which are in the 'on' position back to their 'off' position, away from the ferromagnetic surface 51.

With reference to FIGS. 3 and 6a, each excitation coil arrangement 42 comprises a coil having a lobed shape and comprising a number of coil lobes 42a extending radially outward, equal to half the number N of permanent magnets 45a of the magnet arrangement 45.

In each of the coil lobes 42a, a pair of lateral lobe parts 42b, extending in the radial direction, may be identified, which are connected to radially inner parts 42c of the coil, and are connected to each other by a radially outer lobe part 42d. In the illustrated example, one of the radially outer lobe parts 42d of each coil is separated into two distinct heads connected to respective supply terminals of the coil. According to a view in the axial direction (i.e. perpendicular to the plane of FIGS. 3 and 6), the side lobe parts 42b are aligned with boundary areas between permanent magnets 45a having opposite polarity. In FIG. 6, the position of the magnets 45a is represented with dashed circles.

As the gradient of the magnetic flux is maximum in the dielectric regions near the edges of the magnets 45a (which in the illustrated example have a cylindrical shape), such regions constitute the best position wherein to arrange wires wherein a current may induce a magnetic field. Therefore, a single coil that passes near the edges of the magnets maximizes magnetic induction on all the magnets N, minimizing the number of coils required.

In addition, the specific shape of the excitation coil arrangement 42 allows for easy scalability of the single device in a coil matrix; in particular, the three-lobed coils shown in the drawings may be organized as shown in FIG. 3.

Figure 6B:
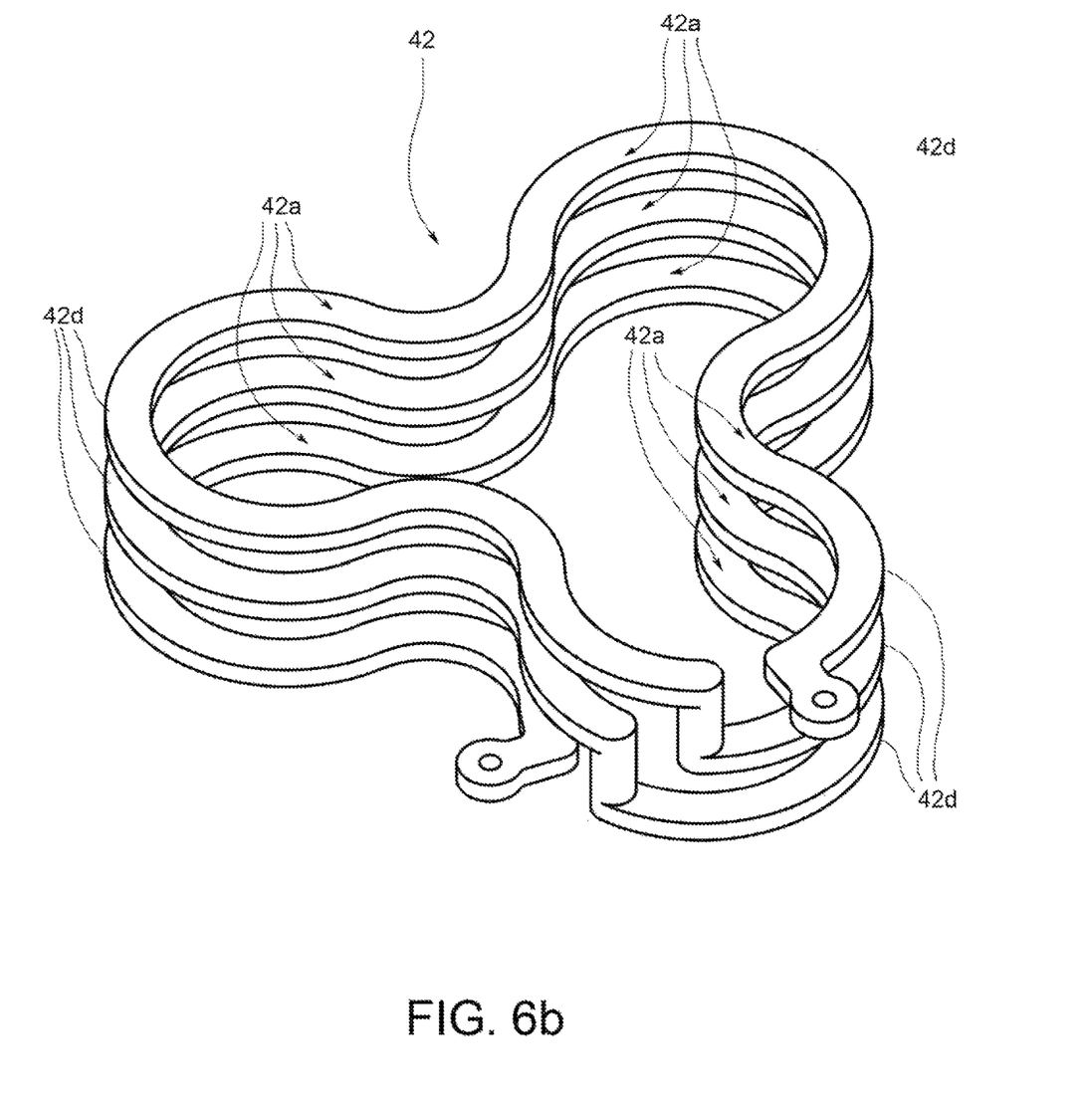
FIG. 6b is a perspective view of a coil arrangement comprising multiple windings.

FIG. 6b shows an alternative embodiment wherein each excitation coil arrangement 42 comprises a plurality of coils overlapping and serially connected to each other. The coils are positioned at an axial distance from each other to minimize the axial extension of the excitation coil arrangement (for clarity of representation, in FIG. 6b, the distances between the coils are shown accentuated). At the macroscopic level, the coil arrangement 42 is still planar, however, because more coils lie on the plane of the plate, which is geometrically separated from the permanent magnet arrangement.

In one embodiment, the device described above may be portable. The bistable mechanism uses magnetic pulses to push the moving armature 41 towards the ferromagnetic surface 51. When the moving armature 41 surpasses the point of unstable force equilibrium, it is attracted to the ferromagnetic surface 51. Such a solution does not prevent the undesired movement of the pins 43 due to gravity if the device is turned upside down. To prevent this phenomenon, an elastic membrane (such as a silicone layer) may be inserted around or over the magnets 45a (any position could theoretically be suitable, with the exception of the area between the magnets and the excitation coil arrangement). The membrane acts as a spring, preventing the moving armature 41 from disconnecting from the excitation coil arrangement 45. The net force required to move the moving armature with this solution is therefore slightly increased by kx, where k is the elastic constant of the membrane and x is the displacement required to bring the moving armature to the unstable equilibrium point; however, current pulses provide enough magnetic force so that the contribution of the elastic force of the membrane may be considered negligible.

In other embodiments, the permanent magnet arrangement may have different shapes, with two indispensable conditions: first, the number of magnets must be even; second, the permanent magnet arrangement must form a closed loop that covers the majority of the boundary lines between adjacent magnets having opposite polarity. An example for this may be that of a magnetic disc or magnetic ring or toroid, divided into sectors with alternating polarity. Such an embodiment would have the further advantage of not requiring a support structure to hold the magnets together.

In the present invention, therefore, the term "permanent magnet region" is used to indicate both a single permanent magnet that is part of an arrangement comprising a plurality of separate magnets, and a single part of a permanent magnet made in a single piece comprising a plurality of parts having distinct polarities.

In other embodiments, the device may be miniaturized depending on the desired force entity and the distance at which the force begins to attract the moving armature to the ferromagnetic surface. Specifically, in the case wherein it is possible to decrease the force retained by the moving armature against the ferromagnetic surface, the volume of magnetic material may be reduced proportionally, thus reducing the size of the single actuator. Moreover, the number N of magnets that form the permanent magnet arrangement may be increased (without varying the volume of the arrangement) to increase the attraction force toward the ferromagnetic surface. Such effect is possible because, by increasing N, the amount of dispersed field decreases. This implies that the magnet arrangement described above has the desirable property of increasing attraction at small distances without increasing volume, which may be particularly important when a miniaturization of the device is desired.

The invention claimed is:

1. An electromagnetic actuator comprising:
    a moving armature comprising a pin movable in a guided manner along a longitudinal axis thereof, and a permanent magnet arrangement arranged coaxially with the pin and fixed thereto, and
    an excitation coil arrangement arranged coaxially with the pin, said coil arrangement being suppliable with current to cause the moving armature to move,
    characterized by further comprising a surface of ferromagnetic material, said permanent magnet arrangement being axially interposed between the surface of ferromagnetic material and the excitation coil arrangement,
    wherein said permanent magnet arrangement comprises a plurality of permanent magnet regions arranged around the pin of the moving armature, in which each permanent magnet region has a polarity in the direction of the longitudinal axis of the pin which is opposite to the polarities of the permanent magnet regions angularly adjacent thereto, and
    wherein said excitation coil arrangement comprises at least one coil having a lobed shape, and comprising a number of coil lobes equal to half the number of permanent magnet regions of the magnet arrangement.

2. The actuator according to claim 1, wherein said excitation coil arrangement is planar.

3. The actuator according to claim 1, wherein each of the coil lobes has a pair of radially outwardly extending side lobe parts which are arranged axially aligned with boundary areas between permanent magnet areas having opposite polarities.

4. The actuator according to claim 1, further comprising elastic means configured to prevent the moving armature from moving away from the excitation coil arrangement by action of gravity.

5. The actuator according to claim 4, wherein said elastic means comprise an elastic membrane fixed to the moving armature.

6. The actuator according to claim 1, wherein the moving armature is capable of assuming a stable off position adjacent to the excitation coil arrangement, and a stable on position adjacent to the surface of ferromagnetic material, and wherein a current pulse supplied to the excitation coil arrangement is capable of moving the moving armature from the off position to the on position, the moving armature staying in the on position by action of magnetic attraction between the surface of ferromagnetic material and the permanent magnet arrangement.

7. The actuator according to claim 6, further comprising a sliding guide within which the pin of the moving armature is partially arranged, and a reference surface at which the sliding guide debouches, wherein when the moving armature is in on position a free end of the pin protrudes with respect to the reference surface by a length such that a pressure exerted on the free end of the pin and capable of taking the free end of the pin to the level of the reference surface is not capable of bringing the moving armature back to the off position.

8. The actuator according to claim 6, further comprising mechanical restoring means axially interposed between the surface of magnetic material and the permanent magnet arrangement, said restoring means being controllable to bring the moving armature back to the off position.

9. A tactile display comprising a plurality of actuators according to claim 1.

10. The display according to claim 9, comprising
    a display plate through which a plurality of sliding guides are formed, within each of which the pin of the moving armature of a respective actuator is partially arranged, and having a reference surface at which the sliding guides debouch, and
    a plurality of support plates arranged parallel to the display plate, each support plate supporting a respective array of actuators, wherein the actuators supported by one support plate are arranged laterally offset with respect to the actuators supported by the other support plates.

* * * * *